United States Patent [19]

Feurgarg

[11] Patent Number: 5,112,567
[45] Date of Patent: May 12, 1992

[54] DEVICE FOR SHUTTING OFF A VERTICAL CONDUIT FOR SUPPORTING AND GUIDING AN ELEMENT OF ELONGATE SHAPE

[75] Inventor: René Feurgarg, La Celle Saint Cloud, France

[73] Assignee: Framatome, Courbevoie, France

[21] Appl. No.: 607,739

[22] Filed: Nov. 1, 1990

[30] Foreign Application Priority Data

Nov. 2, 1989 [FR] France .................. 89 14374

[51] Int. Cl.⁵ .................................... G21C 17/08
[52] U.S. Cl. ................................... 376/245; 376/203
[58] Field of Search .............. 376/203, 277, 245, 247; 251/339, 253; 220/203, 204, 216, 224

[56] References Cited

U.S. PATENT DOCUMENTS

| | | | |
|---|---|---|---|
| 1,263,914 | 4/1918 | Martin | 220/216 |
| 3,054,618 | 9/1962 | Abrams et al. | 251/339 |
| 3,769,156 | 10/1973 | Brecy | 376/255 |
| 3,973,753 | 8/1976 | Wheeler | 251/204 |
| 4,070,239 | 6/1978 | Bevilacqua | 376/245 |
| 4,515,750 | 5/1985 | Pardini et al. | 376/446 |
| 4,728,479 | 3/1988 | Merkovsky | 376/203 |

FOREIGN PATENT DOCUMENTS

3246227 6/1984 Fed. Rep. of Germany .
2524601 3/1982 France .

Primary Examiner—Brooks H. Hunt
Assistant Examiner—Frederick H. Voss
Attorney, Agent, or Firm—Pollock, Vande Sande & Priddy

[57] ABSTRACT

The shutoff device consists of a housing (14) inserted in the conduit, in which a movable shutter (32) is mounted for oscillation about a horizontal axis (33) in the housing (14) and comprising a closing member (35) returned into a position of closing a channel (28) by a counterweight (36). A manometer (43) enables the pressure inside the housing (14) to be measured. The shutoff device, wholly passive in operation, can be employed in particular in a conduit for guiding a measurement probe employed in a pressurized water nuclear reactor.

15 Claims, 4 Drawing Sheets

DEVICE FOR SHUTTING OFF A VERTICAL CONDUIT FOR SUPPORTING AND GUIDING AN ELEMENT OF ELONGATE SHAPE

FIELD OF THE INVENTION

The invention relates to a device for shutting off a vertical conduit for supporting and guiding an element of elongate shape, such as a conduit for guiding a measurement probe in a nuclear reactor.

BACKGROUND OF THE INVENTION

In the use of nuclear reactors, such as pressurized water nuclear reactors, measurements must be performed in the core consisting of the fuel assemblies, while the reactor is in operation. In particular, measurements of neutron flux must be performed in various places along the height of the core, so as to ascertain the neutron flux or power distribution along the axial direction of the core, which is generally the vertical direction.

The fuel assemblies of which the core consists comprise, in their central part, an instrumentation tube into which there may be introduced, over the entire height of the core, a leakproof guide conduit, inside which a neutron flux measurement probe, attached to a flexible cable, is moved while the reactor is in operation. The guide conduits associated with each of the fuel assemblies in which flux measurements are carried out must be capable of being withdrawn from these assemblies, for example when the core is being refuelled. These guide conduits are therefore mounted so that they can move by sliding inside the guide tubes connecting the lower part of the vessel to a measuring room, in which the ends of the guide conduits remote from the ends introduced into the core are accessible for moving the probes, for collecting measurement signals and for moving the guides conduits inside the guide tubes The movement of the guides conduits in the guide tubes is performed merely by pushing or pulling, sufficient clearance being provided to limit the forces to be applied to the guide conduit, despite the curved shape of the guide tubes over a large proportion of their trajectory In a known and widely employed embodiment, the trajectory of the guide conduit is in the shape of a U from the upper part of the guide tube of the corresponding fuel assembly as far as its end entering the measuring room.

The tube for guiding the guide conduit comprises successively a vertical first part attached to the bottom of the vessel, in the extension of a passage channel passing through a part of the lower internal equipment of the reactor and of the guide tube of the corresponding fuel assembly, a horizontal second part and a vertical third part whose upper end is attached to the structure of the nuclear reactor and carries a passage device permitting the leakproof passage of the guide conduit whose upper end part corresponding to the upper part of the second leg of the U, vertical in direction, is situated outside the guide tube. This upper end part of the guide conduit emerges inside the measuring room and has an open end through which a measurement probe attached to the end of a flexible cable can be introduced into the guide conduit.

The leakproof passage device attached to the upper part of the guide tube is positioned slightly above the height of the reactor vessel, so that, during reactor maintenance, when the vessel and the reactor pool are filled with water, this water cannot reach the end of the guide tube in the case where the guide conduit is completely withdrawn from the guide tube. Leakages into the room receiving the end parts of the guide tubes are thus avoided.

When the reactor is in operation, the guide tube is filled with primary fluid at high temperature and under pressure, so that the pressure of this fluid, of the order of 155 bars, is applied to the outer surface of the guide conduit introduced into the guide tube. The leakproof passage device of the guide conduit makes it possible to avoid any leakage of primary water under pressure at the upper part of the guide tube, the sealing being ensured by seals of the passage device in leakproof contact with the outer surface of the guide conduit.

A passage device permitting the leakproof passage of guide conduits of a pressurized water nuclear reactor is describe in applicant's patent FR-A-2,080,077.

The wall of the guide conduit is normally completely leakproof, but can be damaged during use and, in particular, when the guide conduit is being inserted into, or withdrawn from, the guide tube.

In addition, the outer surface of this wall is exposed to a fluid at a high temperature and high pressure, circulating at a high speed in the reactor; this can cause some wall deterioration of the guide conduits, due to a mechanical or thermal phenomenon, or by corrosion. This may result in guide conduits sealing defects, giving rise to a leakage of the primary fluid inside the guide conduit.

Some primary fluid is thus liable to reach the vertical upper part of the guide conduit, which is situated above the leakproof passage device. A manual isolation valve is therefore arranged at the open upper end of each of the guide conduits, allowing the guide conduit to be shut off when it is no longer leakproof.

The closing of this valve requires the intervention by an operator inside the room where the leakproof passage device and the vertical upper end part of the guide conduit are located. As soon as the leakage appears in the guide conduit, contaminated primary liquid spreads into the room, and this enables a leakage in the guide conduit to be detected, requiring the intervention by the operator. The presence of contaminated liquid in the room where the operator intervenes makes this intervention relatively hazardous and can entail some irradiation of the personnel responsible for the surveillance and maintenance of the nuclear power station.

This intervention is all the more hazardous since the outer wall of the damaged guide conduit generally remains subjected to the pressure of the primary fluid in the reactor in operation.

There are known devices for closing a conduit for guiding a measurement probe, which are employed in a pressurized water nuclear reactor, and which are constructed in the form of a ball valve.

There is known, for example, a device of this type, comprising electromagnetic actuating means enabling the ball to be held in a closing position when the measurement probe is not introduced into the conduit.

A device of this kind, which requires actuating means of an active type, offers insufficient safety in operation, insofar as the actuating means may become accidentally unavailable.

There is also known a device consisting of a ball valve in which the ball automatically drops to a closing position by means of gravity when the measurement probe is not introduced into the guide conduit. However, a passively operating device of this kind must be placed in a vertical part of the tube for guiding the guide conduit, which is situated in the vicinity of the vessel bottom. This device consequently does not ensure the closure of the upper end of the guide conduit in the vicinity of the measuring room.

SUMMARY OF THE INVENTION

The object of the invention is therefore to propose a device for shutting off a vertical conduit for supporting and guiding an element of elongate shape, such as a guide conduit for a measurement probe in a nuclear reactor, which makes it possible to limit or to prevent leakages of a fluid entering the vertical conduit and to detect the presence of this fluid in the conduit very rapidly, so as to intervene more rapidly and more safely to ensure the closure of the end of the vertical conduit, both in the case where the element of elongate shape is arranged inside its guide conduit, and when the guide conduit does not contain the element of elongate shape.

For this purpose, the shutoff device according to the invention consists of a housing inserted between a lower section and an upper section of the conduit, comprising:

two leakproof means for connecting the lower section and the upper section of the conduit, respectively, to the housing, a central chamber, a passage channel for the elongate element, comprising an upper part passing through the means of connection of the upper section of the conduit and a lower part passing through the means of connection of the lower section of the conduit, emerging into the central chamber of the housing, a shutter arranged in the central chamber, mounted for oscillation in the housing about a horizontal pivot and comprising a counterweight and a closing member capable of shutting off in a leakproof manner the end of the upper part of the channel emerging into the chamber, when the elongate element is not introduced into the conduit, by tipping the shutter under the effect of the counterweight, and a means for measuring pressure in the region of an opening passing through the wall of the housing and emerging into the central chamber.

BRIEF DESCRIPTION OF THE DRAWINGS

In order that the invention may be more clearly understood, a description will now be given, by way of example and with reference to the attached drawings, of an embodiment of the shutoff device according to the invention in the case of a conduit for guiding and positioning a measurement probe in the vessel of a pressurized water nuclear reactor.

DESCRIPTION OF PREFERRED EMBODIMENT

Figure 1:
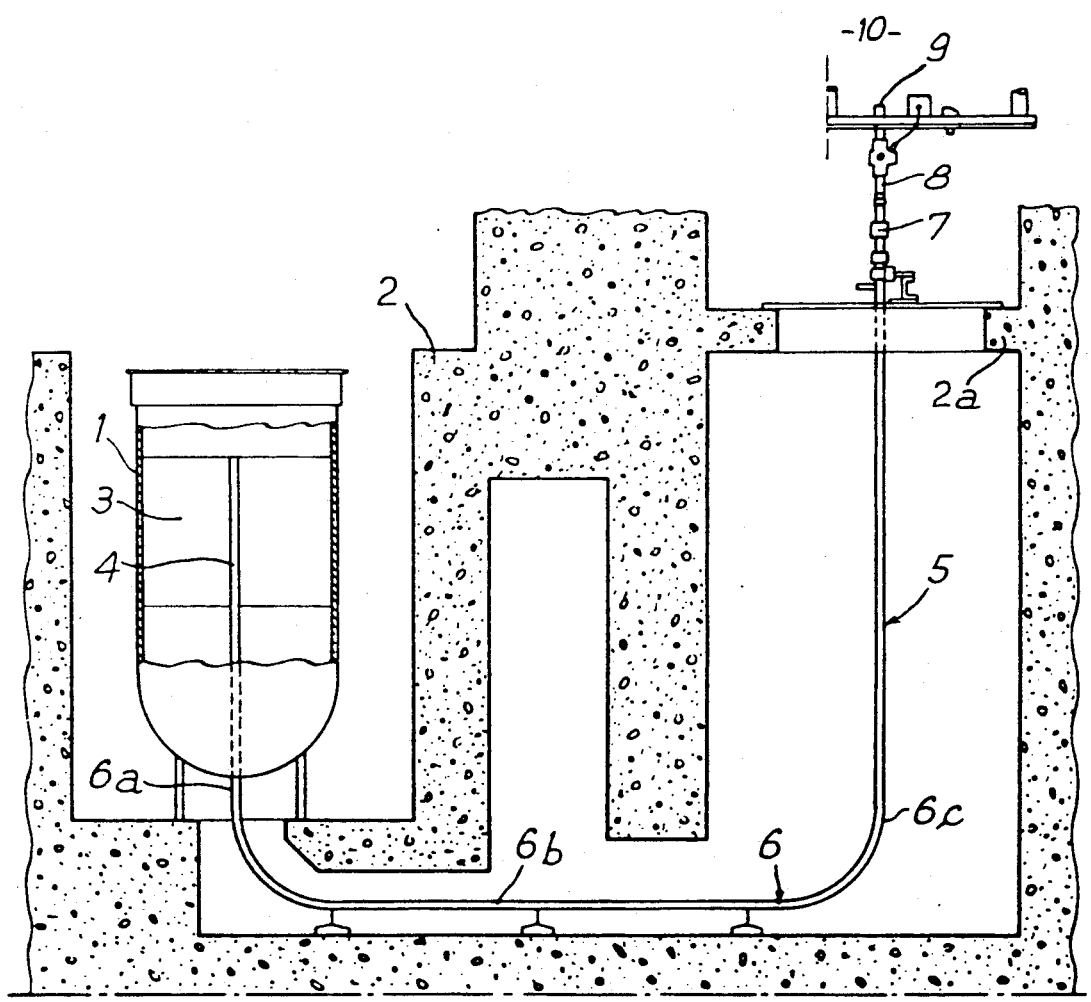
FIG. 1 is a schematic front elevation, partly in section, of a part of a nuclear reactor and of a guide tube of this reactor, comprising a U-shaped conduit for guiding a measurement probe.

FIG. 1 shows the vessel 1 of a pressurized water nuclear reactor, arranged inside a vessel well forming a part of the concrete structure 2 of the nuclear reactor building.

The vessel 1 contains the nuclear reactor core 3, consisting of juxtaposed fuel assemblies.

FIG. 1 shows the guide tube 4 of a core assembly 3 forming the end part, in a vertical direction, of an instrumentation tube 5 enabling neutron flux measurements to be carried out along the height of the reactor core 3.

The U-shaped tube 5 comprises a guide tube 6 passing through the bottom of the vessel in a leakproof manner and fastened to the bottom in the extension of the guide tube 4 and of a junction channel between the bottom of the vessel and the lower part of the guide tube 4 passing through a part of the lower internal equipment of the reactor.

Following the vertical section 6a fastened to the bottom of the vessel, the guide tube 6 comprises a horizontal section 6b and then a vertical section 6c whose upper end is fastened to a part 2a of the nuclear reactor structure.

The sections 6a, 6b and 6c of the guide tube 6 are joined together by curved parts of the guide tube.

The upper end part of the section 6c of the guide tube 6 is connected to a passage device 7 permitting the leakproof passage into the guide tube 6 of a conduit 8 intended to ensure the guiding and the positioning of at least one measurement probe inside the guide tube 4.

The thimble-shaped conduit 8 comprises a closed end intended to occupy a working position inside the guide tube 4 and an open end situated opposite, at the end of the part of the conduit 8 which is situated outside the guide tube 6, above the leakproof passage device 7.

In its upper end part situated outside the guide tube 6, the conduit 8 comprises a manual closure valve 9 intended to shut off the end of the guide conduit in a leakproof manner in the case where the conduit 8 has a sealing defect which may be detected while the reactor is in operation.

The guide conduit 8 or guide conduit makes it possible to perform the guiding and the positioning of one or more measurement probes fastened to a flexible cable which is introduced into the guide conduit 8 through its open upper end.

The tube 5 and the guide conduit 8 forming its internal part intended to receive the measurement probes are in the shape of a U, one of whose vertical legs is inside the reactor vessel and whose other vertical leg emerges in its upper part into a measuring room 10. The insertion and withdrawal of the guide conduits 8 from the guide tubes, the insertion and withdrawal of the measurement probes from the guide conduits, and the recovery and treatment of the measurement signals originating from the probes can all be carried out from the measuring room 10.

The leakproof passage device 7 is positioned above the height of the reactor vessel 1.

When reactor refuelling operations, and possibly maintenance and repair work, are carried out, the reactor vessel is open as shown in FIG. 1, and is full of water. The water level in the guide tubes 6 communicating with the inside of the vessel is then situated below the leakproof passage device 7 of the guide conduits 8.

When the reactor is in operation, the vessel is closed by a closure head and filled with primary water at a pressure of the order of 155 bars.

The guide tubes 6, in each of which a guide conduit 8 is engaged, fill with primary water under pressure up to the height of the leakproof passageway 7, where the closure of the upper end of the guide tube 6 is ensured by the guide conduit 8 interacting with the seals of the device 7.

The outer surface of the wall of the guide conduits 8 is subjected to the pressure of the primary fluid.

In the case where one of the guide conduits 8 has a sealing defect, primary water enters inside the guide conduit and spreads inside the room 10 through the open end of the guide conduit emerging into this room. It then becomes necessary to close the manual valve 9 very rapidly, and this, as indicated above, involves some hazard to the operator.

Figure 2:
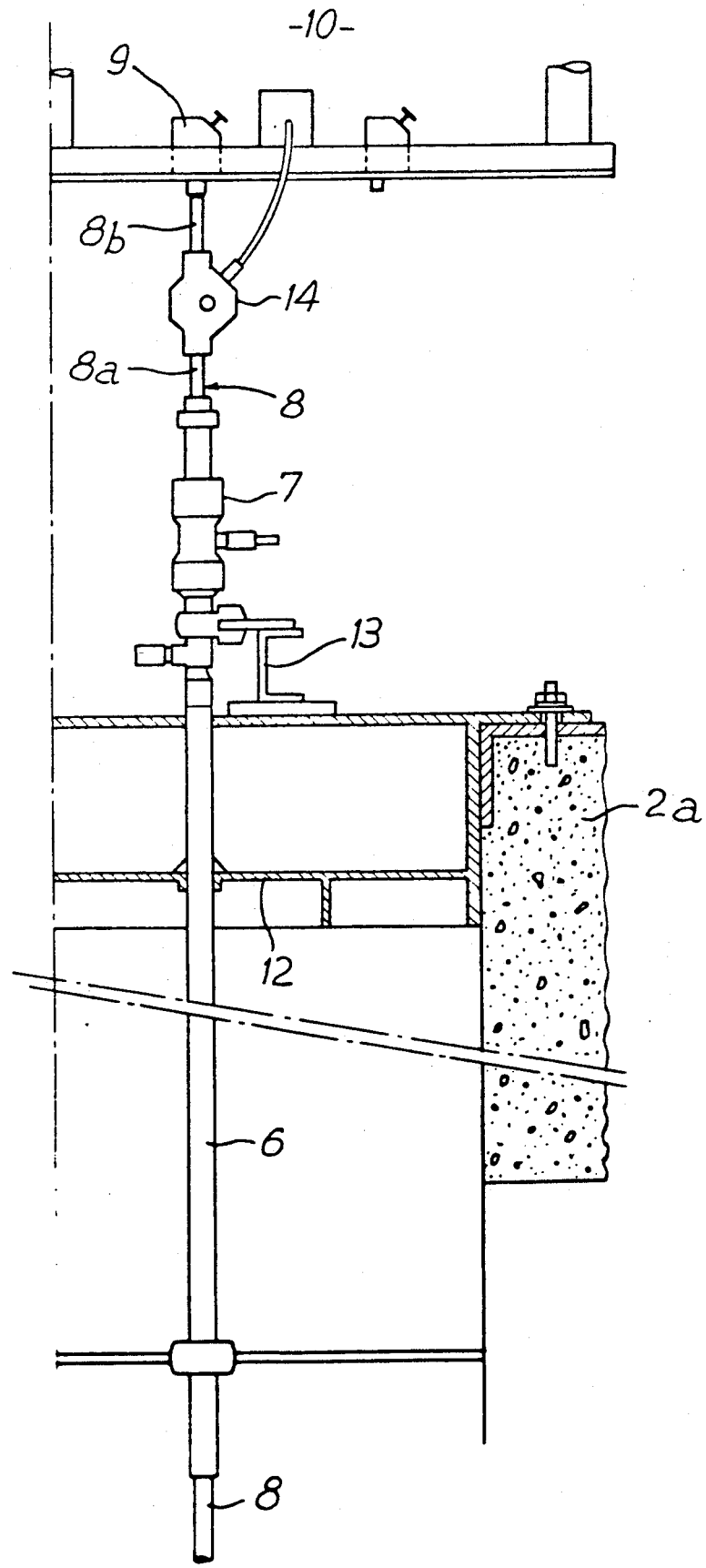
FIG. 2 is a view on a larger scale of the upper end part of a guide tube such in FIG. 1 and comprising a shutoff device according to the invention, inserted in its guide conduit.

FIG. 2 shows the upper part of an instrumentation tube such as the tube 5 of FIG. 1, in the region of the measuring room 10. The corresponding elements in FIGS. 1 and 2 bear the same references.

The guide tube 6 in which the guide conduit 8 is engaged is fastened, in its upper part, to a metal structure 12, itself firmly fastened to the part 2a of the concrete structure of the reactor.

Leakproof passage devices 7 for the guide conduits 8 are fastened to the upper surface of the structure 12 by means of supports 13.

The upper end part of the guide conduit 8, vertical in direction and situated outside the guide tube 6 and the sealing device 7, carries at its upper end a manual closure valve 9 allowing the end of the guide conduit 8 to be shut off in a completely leakproof manner in the case where the wall of this guide conduit exhibits a sealing defect.

Figure 3:
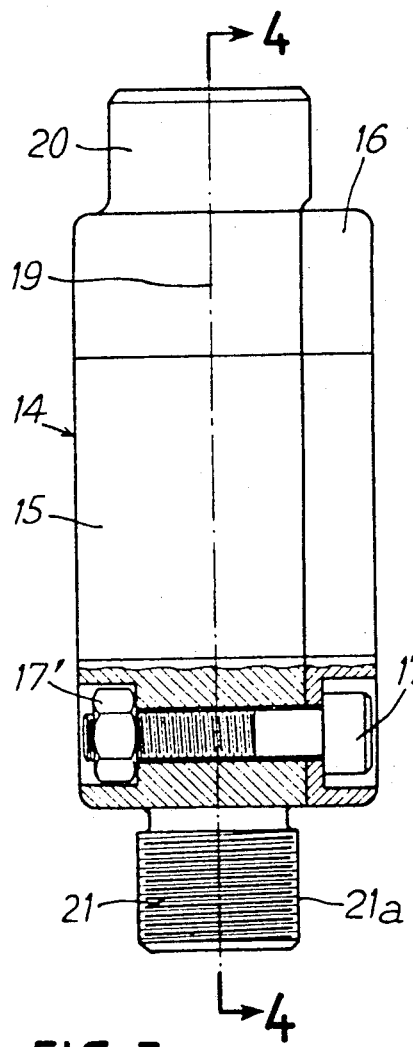
FIG. 3 is a general view, in elevation and in partial section, of a shutoff device according to the invention, constructed in the form of a housing.
Figure 4:
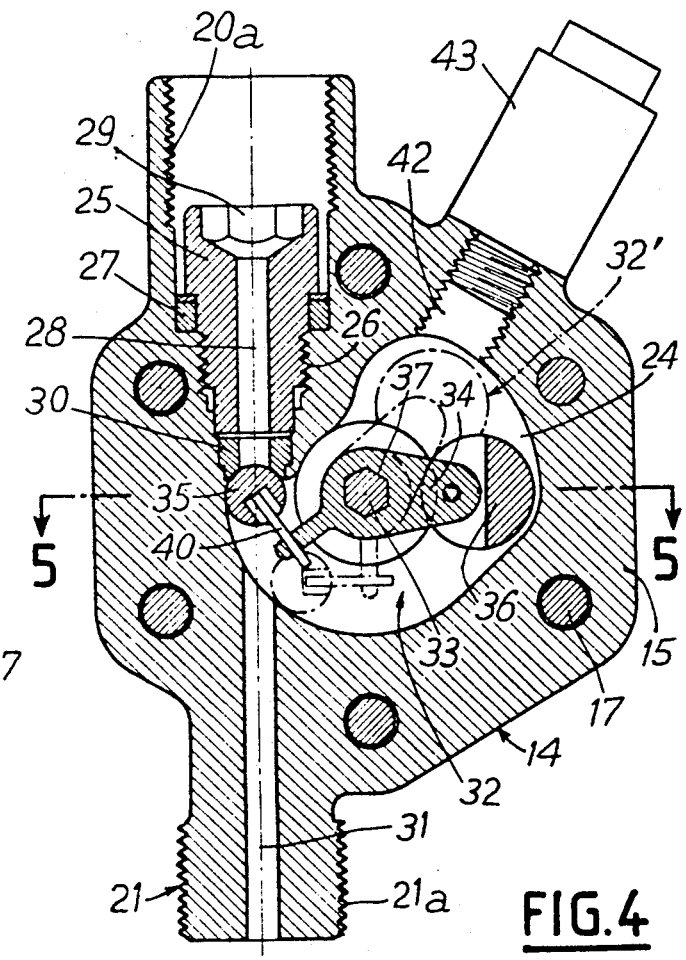
FIG. 4 is a view in section along 4—4 of FIG. 3, showing the shutter in its closed position.
Figure 5:
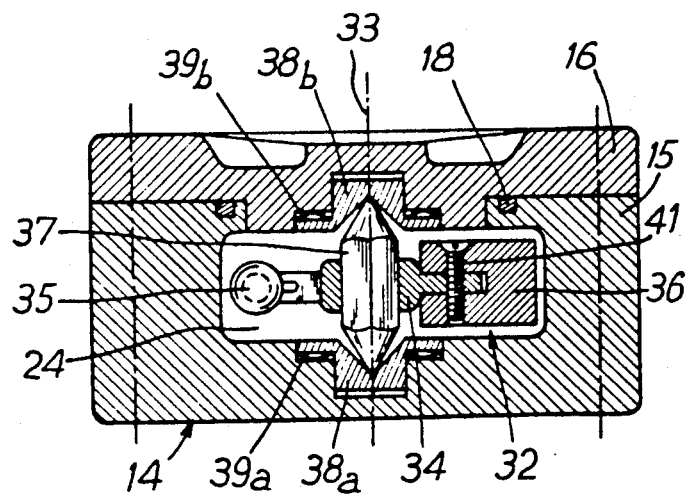
FIG. 5 is a view along 5—5 of FIG. 4.

A shutoff device according to the invention, which will be described in greater detail with reference to FIGS. 3 to 5, is inserted in the vertical upper end part of the guide conduit 8, between a lower section 8a of this upper part and an upper section 8b, to the end of which the manual closure valve 9 is fastened.

In FIGS. 3, 4 and 5 it can be seen that the shutoff device 14 according to the invention is made up in the shape of a housing comprising a thick wall made up of two complementary parts 15 and 16 assembled together by bolts 17 and clamping nuts 17'.

The bolts 17 pass through the two parts 15 and 16 of the housing throughout their thickness and ensure effective clamping of these two parts, between which a seal 18 is inserted, engaged in an annular groove machined into the part 15 of the housing, inside the region of the component 15 through which the bolts 17 pass.

The heads of the bolts 17 are housed in recesses machines into the part 16 forming the over of the housing, and the nuts 17' are locked against rotation in recesses machined into the second component 15 forming the body of the housing to which the cover 16 is fastened.

As can be seen in FIGS. 3 and 4, the body 15 of the housing comprises, along its axis 19, two connection nozzles 20 and 21.

The nozzle 20 comprises an internal bore 20a tapped over a part of its height and forming a housing of cylindrical shape.

The nozzle 21 comprises an external threading 21a.

The parts 20a and 21a of the connection nozzles 20 and 21 are intended to receive couplings firmly attached to the corresponding ends of the sections 8a and 8b of the guide conduit, which are attached by screwing to the housing 14. The sealing of the coupling is ensured by seals or by a weld.

The housing body 15 comprises a cavity 24 which is closed in a leakproof manner by the cover 16 when the housing is assembled by virtue of the bolts 17 and of the seal 18.

The smooth part of the bore of the connection nozzle 20 forms the housing of the head of a bolt 25 fastened in a tapped bore 26 machined into the body 15 of the housing 14 in the extension of the bore 20a. A seal 27 is inserted between a shoulder of the bolt head 25 and the end shoulder of the bore of the connection nozzle 20.

The body 15 of the housing 14 is pierced in the extension of the bore of the nozzle 20 and of the tapped hole 26, so as to form an opening emerging into the chamber 24, inside which is arranged a valve seat 30 made of expanded graphite. The bolt 25 and the seat 30 are pierced axially and throughout their length to form a perfectly calibrated channel 28.

At its upper end, the channel 28 emerges into a prismatic opening 29 making it possible to perform the clamping of the bolt 25 engaged in the bore of the nozzle 20, from the entry part of this bore. The clamping is performed so as to keep the seat 30 in its housing, the limitation of the clamping being obtained by squashing the seal 27, onto which the shoulder of the bolt head is applied through the intermediary of a washer.

A resilient washer is also inserted between the end of the bolt 25 and the upper surface of the seat 30, onto which the pressure exerted by the bolt is applied.

The nozzle 21 is pierced axially to form a perfectly calibrated channel 31 whose diameter is equal to the diameter of the channel 28. The channel 31 emerges into the cavity 24 in the axial extension of the channel 28 passing through the seat 30 and the securing bolt 25.

As can be seen in FIGS. 4 and 5, the housing 14 comprises a shutter 32 mounted for oscillation around a horizontal axis 33, inside the cavity 24, between the body 15 and the cover 16 of the housing.

The movable shutter 32 comprises a balance arm 34 which consists of a cast component obtained by precision molding, a spherical closure member 35 and a counter-weight 36 made of sintered material consisting of nickel-bonded tungsten carbide.

Passing through the central part of the balance arm 34 is an opening which has a cross-section of hexagonal shape, in which is engaged a shaft 37 having a central part of prismatic shape with a hexagonal cross-section and two smooth frustoconical end parts forming pivots.

The pivots of the shaft 37 are engaged in frustoconical cavities of two bearings 38a and 38b, made of hard material and arranged in a cavity provided in the body 15 of the housing and in a cavity of the cover 16 respectively.

The shaft 37 is held by resilient clamping between the bearings 38a and 38b, by virtue of resilient washers 39a and 39b inserted between a shoulder of the corresponding bearing and a shoulder of the cavity in which the bearing is engaged.

When the cover 16 is clamped onto the body 15 of the housing by means of the bolts 17, the shaft 37 is clamped resiliently between the bearings 38a and 38b. The balance arm 34, which is locked onto the prismatic shaft 37 and the whole of the shutter 32 firmly attached to the balance arm 34 are thus mounted movably in rotation inside the cavity 24 of the housing 14.

The prismatic shaft 37 and the bearings 38a and 38b consist of hard material components which can be obtained by powder metallurgy.

The shutter 35 consists of a ball made of hard material and pierced by spark erosion so as to arrange a cavity into which is introduced a spindle or pin 40 of small diameter, brazed at its other end to a part of the balance arm 34, which is situated at some distance from the axis of rotation 33 of this balance arm.

The cavity machined into the ball 35 permits a floating mounting of the ball onto the pin 40, so that when the shutter is in its closing position, as shown in FIG. 4, the ball 35 is engaged in a hemispherical cavity machined into the seat 30 at the end of the channel 28.

The floating mounting of the ball makes it possible to improve the contact between its outer surface and the hemispherically shaped seat bearing to ensure leakproof closure of the channel 28 passing through the seat 30 and the bolt 25.

The counterweight comprises an internal spot facing in which there is engaged an end part of the balance arm 34 remote from the part to which the pin 40 is fastened, in relation to the axis of rotation 33 of the shutter. The counterweight 36 is fastened by a screw 41 to the balance arm 34.

The position of the counterweight 36 enables the ball 35 to be returned to a closing position inside the hemispherical cavity of the seat 30, as shown in FIG. 4.

The body 15 of the housing 14 forming a wall surrounding the cavity 24 is traversed throughout its thickness by a tapped hole 42 in which there is fastened by screwing the connecting end of a manometer 43 enabling the pressure inside the cavity 24 to be monitored continuously. The manometer 43 consists of a pressure sensor which activates an electrical device such as an all-or-nothing contact whose signal is conveyed by a cable to an alarm device placed in the measuring room 10.

If the pressure inside the chamber 24 exceeds a certain predetermined value, an alarm signal is transmitted, so as to alert the operator responsible for supervising the measuring room 10.

As can be seen in FIG. 2, the shutter 14 is inserted between two sections 8a and 8b of a guide conduit of the pressurized water nuclear reactor, intended to ensure the support and the guiding of a measurement probe fastened to the end of a flexible cable.

The diameter of the measurement probe and of the flexible cable is very slightly smaller than the internal diameter of the channels 28 and 31 passing through the connection nozzles of the housing 14.

The probe fastened to the end of its measurement cable can be introduced into the guide conduit so that it enters the upper section 8b of the guide conduit, and then into the connection nozzle 20 of the housing 14 and into the channel 28. On leaving the channel 28, the probe exerts a downward thrust on the ball 35 for closing the seat 30 in a sealed manner, and this makes the shutter 32 tilt into its position 32,, shown in broken lines in FIG. 4 and in continuous lines in FIG. 6. The measurement probe and its connection cable 45 are introduced into the channel 31 passing through the nozzle 21, and then into the lower section 8a of the measurement conduit engaged inside the sealed passage device 7.

The probe and its connection cable are guided by the guide conduit until the probe has reached, in its working position, the inside of the reactor core 3.

Figure 6:
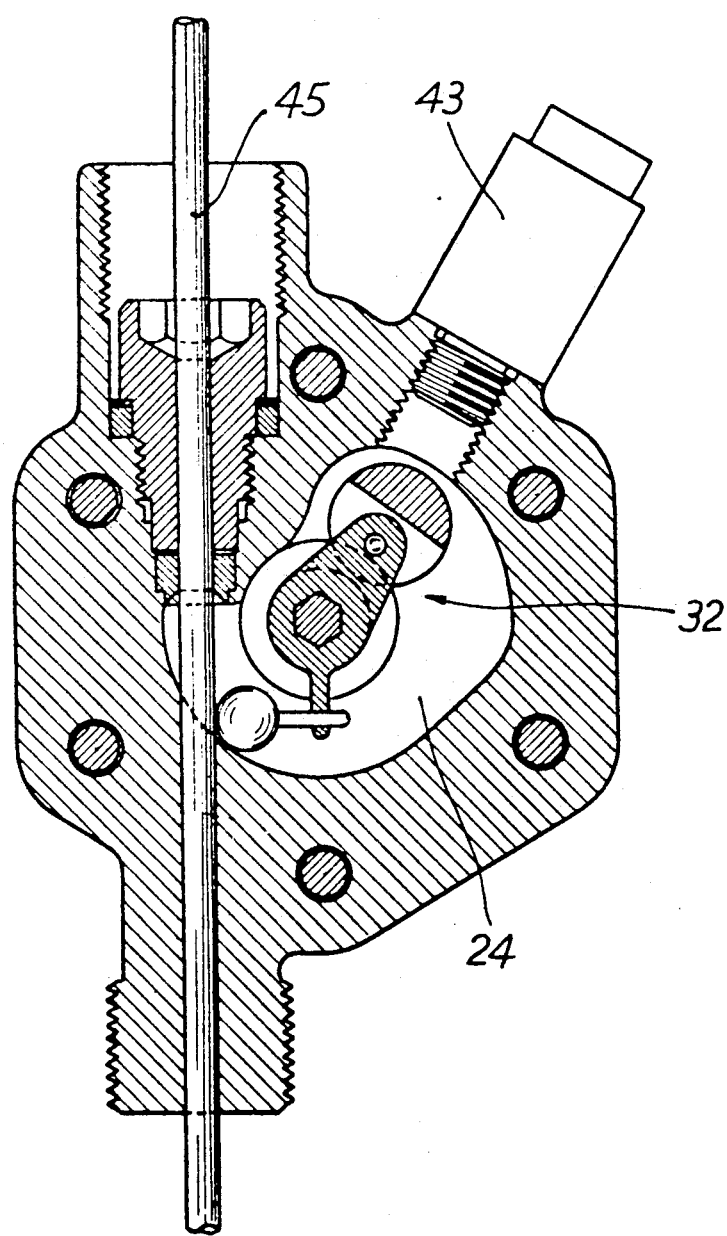
FIG. 6 is a sectional view similar to FIG. 4, showing the shutter in its open position.

As can be seen in FIG. 6, when the probe is in place in the measurement conduit, the cable 45 is engaged inside the channels 31 and 28 with a very small clearance.

If the guide conduit in which the measurement probe is engaged exhibits a sealing defect, the pressurized water of the nuclear reactor entering the guide conduit 8 is subjected to a very large pressure drop in the region of the very narrow annular space remaining between the outer surface of the cable 45 and the surface of the channel 31. Water at a pressure which is much lower than the primary pressure begins to fill the cavity 24 of the housing 14. When the pressure in the cavity 24 exceeds the predetermined surveillance threshold, the manometer 43 sends a signal to the measuring room, which alerts the operator to the presence of a leakage through the wall of the guide conduit 8. The operator can then close the valve 9 ensuring the sealing of the guide conduit before contaminated liquid spreads to the room 10.

When the measurement probe and its cable 45 are not in position inside the guide conduit, the shutter 32 is in its position shown in continuous lines in FIG. 4. The ball 35 is applied against the seat 30 by the counterweight 36 of the shutter 32.

If the thimble has a leakage, pressurized water from the nuclear reactor enters this guide conduit and comes to the point of filling the cavity 24. The pressurized water exerts an upward vertical force on the ball 35, which is thus applied against the hemispherical cavity of the seat 30 with a pressure which is proportionally higher, the higher the pressure in the cavity 24. The shutter 32 thus ensures leakproof closure of the upper part of the guide conduit, and this prevents a leakage of pressurized water into the room 10.

An alarm signal is transmitted to the measuring room by the pressure sensor 43 as soon as the pressure in the chamber 24 exceeds the predetermined surveillance threshold.

The operator is thus alerted and closes the valve 9 of the guide conduit, in order to increase the safety of the leakproof closure of this guide conduit exhibiting a leakage.

In all cases, if a leakage through the wall of a guide conduit arises, the operator can perform the leakproof closing of this guide conduit before contaminated liquid spreads into the measuring room.

In the case where the measurement probe is not introduced into the thimble, the shutter according to the invention ensures leakproof closure of the guide conduit in an automatic and passive manner when a leakage appears through the wall of the guide conduit.

The invention is not limited to the embodiment which has been described.

The wall of the housing 14 forming the shutoff device can be made in a manner other than that described, starting with different components of a body and of a cover of suitable shape which are obtained by precision molding.

The method of construction of the housing in two parts added onto one another and fastened by bolts with the insertion of a seal makes it possible to facilitate the mounting of the shutoff device and in particular of the movable shutter situated in its central cavity.

It is also obvious that the passage channels for the measurement probe and for its connection cable can be made in a way which differs from that described.

Similarly, the seat onto which the closing device of the movable shutter is applied can be made and fastened inside the housing in a way which differs from that described.

Similarly, the movable shutter may differ in shape from that described. The counterweight may be made as a single component with the body or balance arm of the shutter and the shaft of rotation of this shutter may be made in a form which differs from that described.

The closing member of the shutter may be other than a ball, and may be fastened to the body or balance arm of the shutter in any suitable manner.

Lastly, the shutoff device according to the invention may be employed not only in the case of a guide conduit introduced into a pressurized water nuclear reactor and receiving a measurement probe fastened to the end of a flexible cable, but also in the case of any measurement conduit of a nuclear reactor or of any other industrial plant employing a fluid under pressure and requiring remote measurements.

Still more generally, the shutoff device according to the invention may be employed in any vertical conduit used to support and guide an element of elongate shape, and into which a fluid under pressure is liable to enter accidentally.

I claim:

1. In a nuclear reactor system having a pressure vessel and a guide conduit for a measurement probe of elongate and generally cylindrical shape extending into said reactor vessel, a device for shutting off said conduit, said device comprising
   (a) a housing inserted between a lower section of the conduit in communication with the pressure vessel and an upper section of the conduit and having two means for leakproof connection to the lower section and the upper section of the conduit, respectively, and a wall bounding an inner chamber of said housing;
   (b) a passage channel for the measurement probe comprising an upper part passing through the means of connection of the housing to the upper section of the conduit and a lower part passing through the means of connection of the housing to the lower section of the conduit, emerging in an inner chamber of the housing;
   (c) a shutter arranged in said inner chamber and oscillating about a horizontal axis between a closed and an open position of an inner end of the upper part of the passage channel emerging in the inner chamber and comprising a closing member which cooperates with said inner end in a closed position to close the passage channel and a counterweight for returning the closing member in the closed position; and
   (d) means for measuring the pressure into the inner chamber of the housing.

2. Shutoff device according to claim 1, wherein said wall of said housing comprises a body and a cover attached in a leakproof manner by virtue of a seal onto said body and clamped by a plurality of bolts.

3. Shutoff device according to claim 1, wherein said upper connection means of the housing consists of a nozzle comprising a bore with a vertical axis emerging into said inner chamber of said housing, in which bore there is fastened a seat comprising a support bearing for said closing member of said shutter.

4. Shutoff device according to claim 3, wherein said seat is fastened in said bore of said nozzle by a bolt engaged and fastened in a leakproof manner in aid bore of said nozzle and bearing on said seat, said seat and said bolt being pierced axially to form the passage channel for said measurement probe.

5. Shutoff device according to claim 3, wherein said seat is made of graphite.

6. Shutoff device according to claim 1, wherein said shutter comprises a balance arm fixed to a shaft rotatably mounted inside said housing, said shaft having a first end part to which said closing member is fastened and a second end part remote from said first end part relative to the axis of rotation of said shutter and carrying said counterweight.

7. Shutoff device according to claim 6, wherein said shaft comprises conically shaped end pivots engaged in bearings of corresponding shape, said bearings being placed in cavities arranged in the inner surface of said wall of said housing.

8. Shutoff device according to claim 7, wherein resilient return elements are inserted between said bearings and corresponding parts of said cavities in said wall of said housing.

9. Shutoff device according to claim 7, wherein said cavities receiving said bearings are machined into two components which are attached to each other to form said housing.

10. Shutoff device according to claim 1, wherein said guide conduit closed at one of its ends through which it is introduced into said pressure vessel comprises an end part remote from its closed end, said end part being open and emerging outside a vertical guide tube, by means of a leakproof passage device situated at a height above the upper level of the reactor vessel, and said housing is inserted in a vertical end part of said guide conduit above said leakproof passage device.

11. Shutoff device according to claim 10, wherein said device for measuring pressure is connected to an alarm means situated in a measuring room receiving the upper part of said guide conduit.

12. Shutoff device according to claim 11, wherein the upper end part of said guide conduit is connected to a leakproof manual closing valve.

* * * * *

UNITED STATES PATENT AND TRADEMARK OFFICE
CERTIFICATE OF CORRECTION

PATENT NO. : 5,112,567
DATED : May 12, 1992
INVENTOR(S) : Rene FEURGARD It is certified that error appears in the above-identified patent and that said Letters Patent is hereby corrected as shown below: On the title page, Item [75]:

Please correct inventor's last name to -- Feurgard --.

Column 10, line 15, change "aid" to -- said --.

Signed and Sealed this

Thirty-first Day of August, 1993

*Attest:*

*Attesting Officer*

BRUCE LEHMAN

*Commissioner of Patents and Trademarks*